United States Patent Office 3,155,108
Patented Nov. 3, 1964

3,155,108
FLUID FLOW CONTROL VALVES
Peter Bruno Kahn, Loughton, and Norman Frederick North, North Romford, England, assignors to The Plessey Company Limited, Ilford, England, a British company
Filed Jan. 8, 1962, Ser. No. 165,287
Claims priority, application Great Britain, Jan. 10, 1961, 1,067/61
15 Claims. (Cl. 137—220)

This invention relates to a fluid flow control valve and is more particularly concerned with a control valve which is capable of effecting pressure reduction and also capable of wholly shutting off the fluid flow as and when required.

It is an object of the present invention to provide a fluid flow control valve which is compact.

Broadly, according to the present invention there is provided a fluid flow control valve including a first valve member which is arranged to open or close a fluid flow path, a second valve member arranged in series with the first valve and arranged to open or close said flow path downstream of the first valve member, wherein said second valve member is arranged to be subjected to the differential pressure between upstream and downstream sides of the second valve in such manner that the pressure downstream of the second valve tends to close the second valve to shut-off said fluid flow and such that the fluid pressure upstream of the second valve is arranged to act on the second valve in such direction as to tend to open same, and wherein means are provided whereby the first valve can be selectively operated irrespective of the pressure differential across the second valve within the fluid flow channel to close off the fluid flow.

For a better understanding of the invention reference will now be made to the drawings accompanying the specification in which FIGURE 1 is a cross sectional elevation of a combined pressure reducing, shut-off and non-return valve, the valve being shown in its position of rest, FIGURE 2 is a section of the valve of FIGURE 1 in which the valve is in its operative setting at which it effects pressure reduction.

Figure 1:
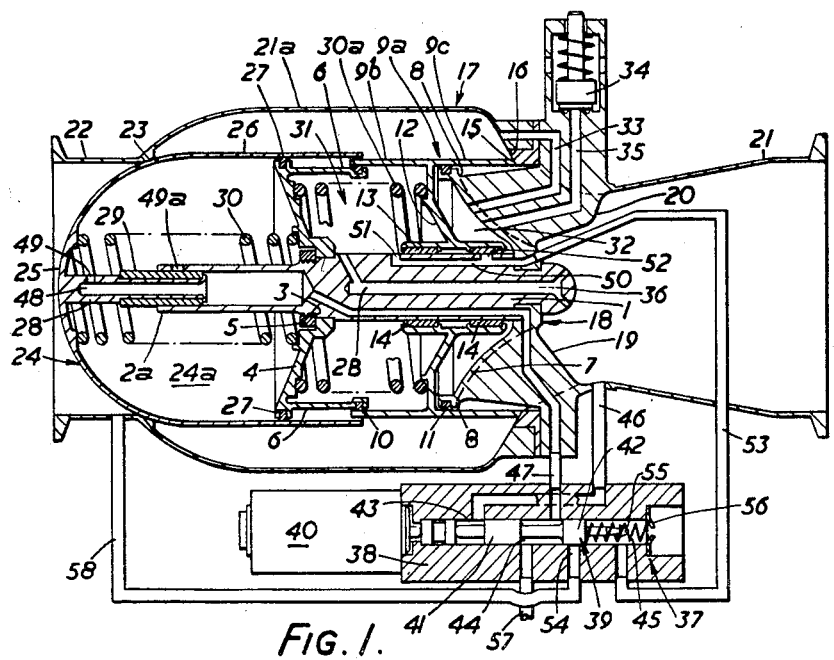

Referring now to FIGURE 1 the valve shown therein includes a central rod 1 which is stepped intermediate of its ends so as to provide a section 2A of reduced diameter and a section 2B of larger diameter. The transition between the diameters provides a step 3 which serves as a seating for a first dished member 4, the dished member 4 is secured to the rod 1 by a locking ring 5. The dished member 4 is provided with a cylindrical sleeve 6 which extends coaxially with the rod 1, in such direction that the sleeve 6 overlies a part of the rod section 2B with the larger diameter. A second dished member 7 is fixedly secured to the rod 1. The dished member 7 terminates in an annular flange 8 which extends coaxially with the rod 1 the flange having an external diameter which is the same as that of the cylindrical sleeve 6 on the dished member 4.

A cylindrical hollow sleeve 9 forming part of a piston valve 9A is slidably mounted on the sleeve 6 and the flange 8, a fluid-tight sealing being provided between the sleeve 9 and the portion 6 and the flange 8 via piston rings 10 and 11. The sleeve 9 is carried upon a dished web or plate 12 which is integral with a cylindrical boss 13 which is itself slidably mounted via suitable sealing means 14 and 15 upon the section 2B of the rod member having the greater diameter 1. The web or plate 12 is located intermediate of the ends of the sleeve and effectively divides the sleeve into two sections 9B and 9C. One peripheral annular end face 15 of the sleeve 9 acts as an annular knife edge which is arranged to co-operate with an annular conical valve seating 16 which forms part of the casing 17 of the valve. The dished member 7 is positionally supported with respect to the casing 17 by means of a spider arrangement 18 which includes three or more equiangularly spaced webs 19 and 20 (these being the only webs shown in the figures).

The casing 17 includes a rear flared portion 21, a central body portion 21A, a front cylindrical portion 22 which defines the fluid flow duct at the inlet side of the valve and which is of a smaller diameter than the portion 21. The transition between the body portion 21 and the cylindrical portion 22 provides a further valve seating 23 with which a piston valve 24 co-operates. The piston valve 24 includes a hemispherical body 25 which terminates in a cylindrical portion 26 extending coaxially of the rod member 1, the cylindrical portion 26 being slidably mounted on the dished member 4. A suitable sealing means in the form of a ring 27 is interposed between the cylindrical part 26 and the dished member 4. The valve 24 is provided with an inwardly directed axially positioned spigot 28 which slidably engages a bore formed in the portion 2A of the rod member 1. A cylindrical sealing means 29 provides a fluid tight seal between the spigot 28 and the portion 2. A spring 30 resiliently loads the valve 24 with respect to the dished member 4 in such direction as to move the valve 24 towards the seating 23.

The piston valve 9A is resiliently loaded by a spring 30A with respect to the dished member 4 in such direction as to move the valve 9 into engagement with its valve seating of the housing 17.

The dished member 4, the cylindrical portion 6, the sleeve section 9B and one side of the web 12 effectively defines a first fluid tight chamber 31. The other side of the web 12, the dished member 7 and the sleeve section 9C define a second fluid tight chamber 32. In addition the valve 24, the dished plate 4, the spigot 28 and the portion 2A define a further fluid tight chamber 24A. A fluid duct 33 provides a fluid flow path from the interior of the housing 17 into the chamber 32 which by-passes the valve 9A. The duct 33 passes through the web 20. A pressure relief valve 34 is provided for maintaining a predetermined maximum pressure within the chamber 32, the valve 34 communicating with the chamber 33 via a further duct 35 which is conveniently shown as passing through the web 20. The pressure relief valve 34 is conveniently adjustable so as to provide for a variation in the maximum pressure settings within the chamber 32.

The chamber 31 communicates with the downstream side of the valve 9A via a duct 36 which extends axially through the portion 2B of the rod member 1. With the arrangement as so far described it will be seen that the chamber 31 communicates with the downstream side of the valve 9A whilst the chamber 32 communicates with the upstream side of the valve 9A. In other words downstream pressure tends to close the valve and upstream pressure tends to open it.

A manually operative electrical solenoid valve unit 37 is associated with the above-described valve. The unit includes a metal valve block 38 containing a slide valve 39 which is movable relative to the block by means of a solenoid 40. The slide valve 39 has two cylindrical piston valve members 41 and 42 which effectively divide the valve chamber within the block 38 into three separate chambers 43, 44 and 45. The chamber 43 is connected via a duct 46 with the downstream side of the valve 9A. The chamber 44 is connected with the interior of the valve member 24 via a duct 47 which extends through the spider web 19, and lengthwise of the rod member 1 into the interior of the reduced diameter portion 2A. The interior of the portion 2A communicates with the interior of the valve member 24 via a duct 48 which extends lengthwise of the spigot 28 and which communicates with the interior of the valve via a transverse port 49.

A further bore 50 extends lengthwise of a portion of the rod member 1, one end of the bore 50 terminates in a transverse bore 51 which communicates with the chamber 31 when the valve 9A is closed. A second transverse bore 52 in the rod member 1 connects the bore 50 with the chamber 32 when the valve 9A is open. The bore 50 is in fluid connection with the chamber 45 via a fluid duct 53. The length of the boss 13 is so selected that the outlet end of the bores 51 and 52 are closed or uncovered as required. A further fluid duct 58 connects the upstream side of the valve 24 with the solenoid controlled valve, the duct 58 terminating within the block 38 at a location 54 immediately opposite the member 42 when the latter is in the position shown in FIGURE 1. An additional duct 57 is provided within the valve block 38, the duct communicates with the atmosphere and with the chamber 44 when the slide valve is in the position shown in FIGURE 1.

The above-described valve operates as follows. Referring particularly to FIGURE 1 in which the valve is shown in its rest position the chamber 24A is vented to atmosphere via the ducts 49, 48 and 47, the chamber 44 and the duct 57. The spring 30 pushes the valve 24 against its seating 23 thereby shutting off the portion 21A from the upstream side of the valve 24. The spring 30A pushes the valve 9A into its closed position, that is, the annular edge 15 abuts the valve seating 16.

Figure 2:
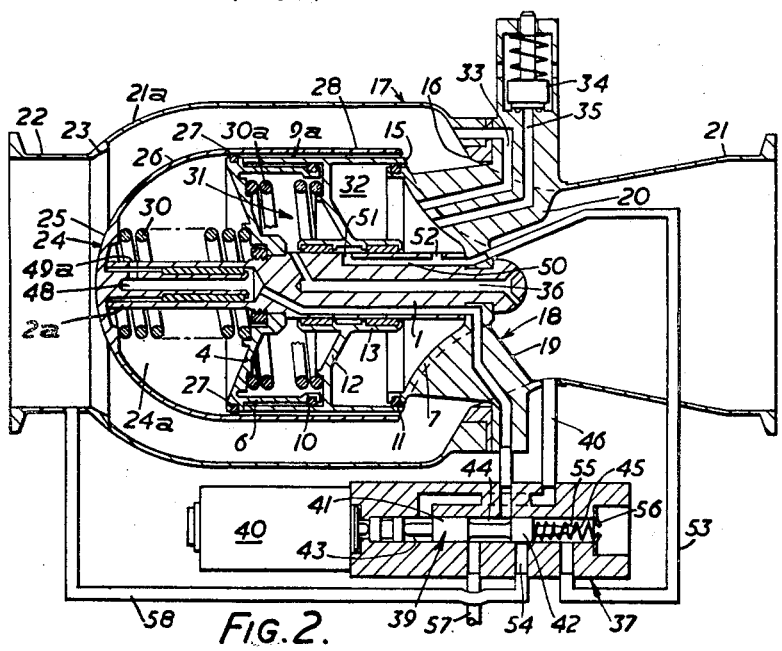

When pressurised fluid is introduced into the upstream side of the valve 23 this pressurised fluid will push the valve 24 off its seating as soon as it overcomes the loading of the spring 30 so that it moves substantially into the position shown in FIGURE 2. The movement of the valve 24 will drive air out from the chamber 24A via the ducts 49, 48 and 47, the chamber 44 and the duct 57 to atmosphere. The pressurised fluid passes into the interior of the housing portion 21a and some of the pressurised fluid will travel via the duct 33 to the reverse side of the piston valve 9A. As soon as the pressure within the chamber 32 increases to a value which exceeds the pressure exerted by the spring 30A the valve 9A will open thereby allowing pressurised fluid to flow from the portion 21A into the portion 21. It will be noted that the transition from the portion 21A into the portion 21 is in the nature of a venturi.

Pressurised fluid will pass via the duct 36 into the interior of the chamber 31, this pressure tending to reinforce the loading of the spring 30A. The piston valve 9A is thus subjected to a differential pressure which is the difference between the spring loading and the pressure exerted on the chamber 31 side of the web 12 and the pressure exerted on the chamber 32 side of the web 12. The maximum pressure within the chamber 32 is controlled by means of the pressure relief valve 34. The construction of the valve 9A is such that when the valve 9A is operating as a normal pressure reducing valve the boss 13 of the piston valve 9A will move to a position in which it closes off the chamber 31 from the transverse bore 51, thereby preventing a fluid connection between the chamber 31 and the chamber 45 in the solenoid controlled valve block 38. When the boss 13 is in the position shown in FIGURE 2 it will be noted that chamber 32 is also connected to atmosphere via the duct 53 and the chamber 45.

Figure 3:
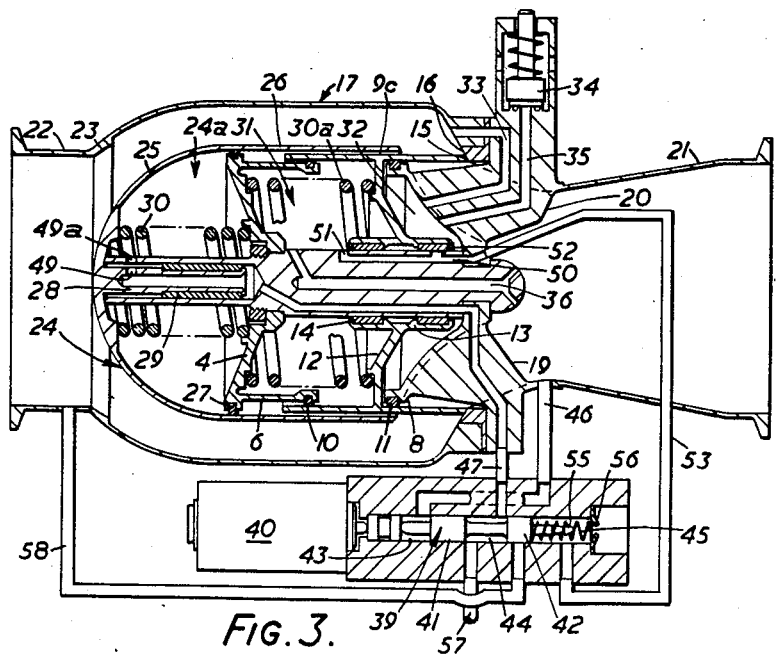
FIGURE 3 is a cross sectional view of the valve of FIGURE 1 illustrating the valve when in its operative setting at which it acts as a non-return valve.

In the event that the pressure downstream of the valve exceeds a predetermined value, governed by the design factor of the valve, the excess pressure in the downstream side of the valve will cause the valve 9A to move under the combined action of its spring 30A and the pressure within the chamber 31 to its closure position this is shown in FIGURE 3. This closure movement of the valve 9A will cause the pressure within the chamber 32 to rise above its normal value and the pressure relief valve 34 will operate to allow the excess pressure within the chamber 30 to fall. At the same time the boss 13 will move relative to the rod 1 so that it closes off the bore 52 which had hitherto connected the chamber 32 with the chamber 45 of the solenoid valve.

When the valve 9A is in the fully closed position shown in the FIGURE 3 it acts as a non-return valve. It will be observed that the upstream pressure is still being applied to the interior of the chamber 32 via the duct 33. Nevertheless owing to the pressure drops which will occur through the duct 33 the pressure within the chamber 32 will not increase to such an extent as to urge the valve 9A to move into its open position until the pressure at the downstream side of the valve 9A falls to a level which reduces any pressure build-up within the chamber 31 to a value which allows the pressure within chamber 32 to move the piston valve 9A towards its open position.

Figure 4:
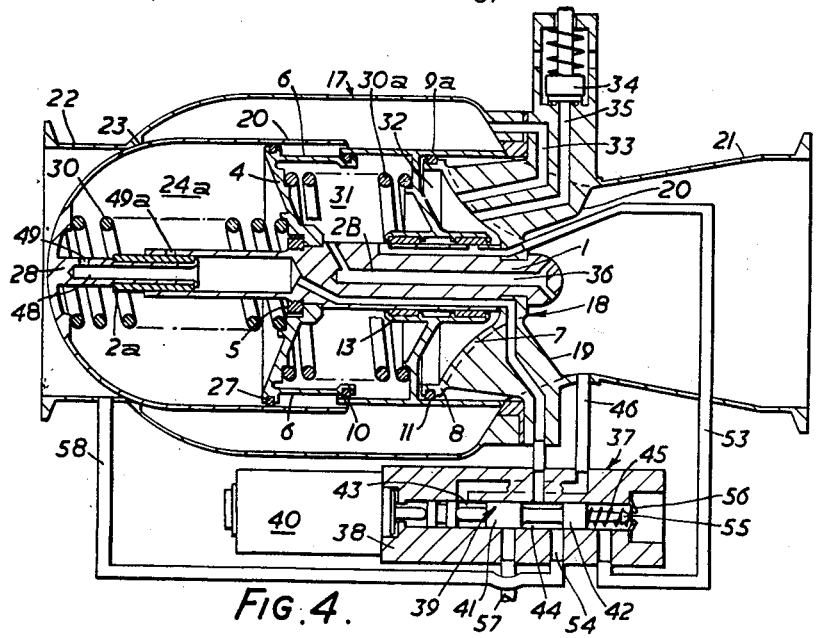
FIGURE 4 represents a valve of FIGURE 1 when it has been selectively operated so as to effect a complete shut-off of fluid flow therethrough.

Referring particularly now to FIGURE 4 this figure illustrates the valve when it is desired to effect a selective shut-down by utilising the solenoid valve. The solenoid 40 is energised so that the slide valve 39 is moved from the position shown in FIGURE 1, 2 or 3 into the position shown in FIGURE 4. In this position the chamber 24A is placed in communication with the pressure at the upstream side of the valve 24 via the duct 58, the chamber 44, the duct 47, the duct 48 and the transverse bore or duct 49. Upon equalisation of the pressure within the chamber 24A with that upstream of the valve seating 23 the spring 30 becomes the deciding factor in the control of the movement of the valve 24 which therefore moves to its closed position. As soon as the valve 24 moves to its closed position the datum pressure within the chamber 32 will progressively leak away to that in the downstream side of the valve so as to allow the valve 9A progressively to be moved into its closed position by the spring 30A upon release of the solenoid the slide valve 39 is moved back into its original position so that the valve is able to operate as a pressure reducing or shut-off valve.

Figure 5:
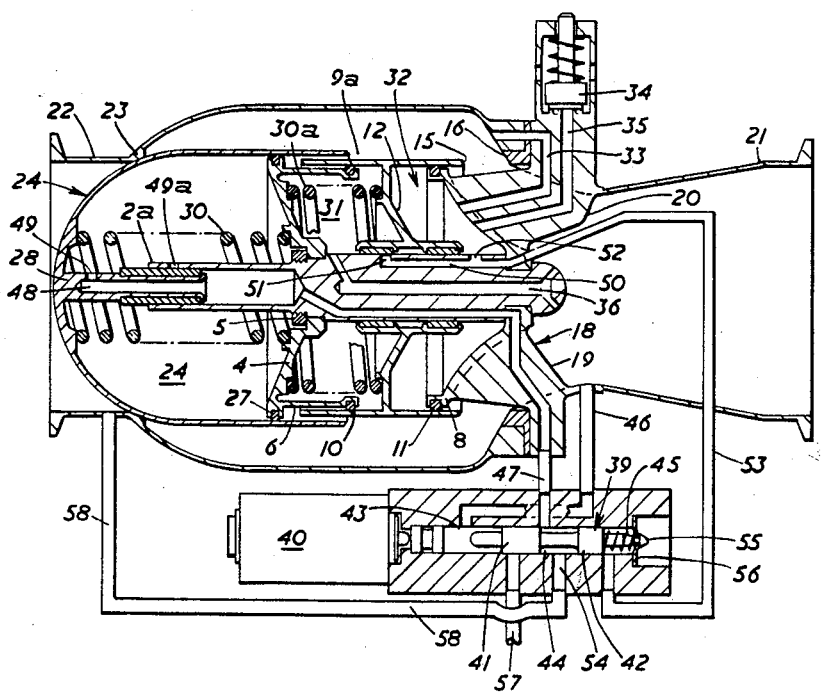
FIGURE 5 is a cross sectional representation of the valve of FIGURE 1 when the valve has been mechanically locked in a fully shut down position.

If for any particular reason the valve 9A should stick or lock in an open position and the pressure downstream of the valve 9A rises above a certain predetermined pressure the pressure which is produced within the chamber 43 via the duct 46 will increase to such a value that the slide valve 39 is moved into the position shown in FIGURE 5 in which the catch member 55 locks with the catch plate 56. When the slide valve is moved into this position the pressure within the chamber 24A is equalised to that within the upstream side of the valve seating 23 via the duct 58, the valve chamber 44, the ducts 47, 48 and 49. The valve 24 moves to its closed position by reason of the spring loading thereof. Further flow of fluid past the valve 24 is prevented even though the valve 9A cannot move to its closed position. The engagement of the catch member 55 with the locking plate 56 ensures that the slide valve 39 does not return to its normal operative position even though the pressure within the downstream side of the valve falls below the value which originally caused the valve 39 to move into its locked position. This locking of the slide valve in the position shown in FIGURE 5 ensures that the valve 24 cannot open until the catch member 55 has been manually dis-engaged from the catch plate 56.

It will be appreciated that the locking of the slide valve 39 in the position shown in FIGURE 5 provides a visual indication that the downstream side of the valve 9A has undergone an excess pressure; whereupon it will be possible to examine the system coupled to the downstream side of the valve 9A.

If desired the chamber 32 can be provided with a selective leak to atmosphere.

The above described valve is particularly suitable for use in an aircraft cabin air supply system. The pressure reducing feature allows the pressure within the cabin to be controlled at desired values. The one-way valve feature prevents excess pressure build-up within the cabin. The solenoid controlled cut-off of the valve allows the aircraft pilot to prevent air from entering the cabin whenever the air is contaminated or otherwise unsuitable for introduction into the interior of the aircraft.

In addition since the solenoid is able to restore the operative conditions within the valve it will be seen that the operation of the solenoid is reversible.

What we claim is:

1. A fluid flow control valve including a conduit, an inlet valve in the conduit, resilient means urging the valve to a normally closed position, a second vlave in the conduit resiliently loaded to a normally closed position, the second valve being positioned downstream of the inlet valve, an auxiliary chamber for pressure fluid, a movable member in said chamber dividing the chamber into first and second sub-chambers, the movable member being operatively connected with the second valve so that pressure fluid in the first sub-chamber tends to close the valve while pressure in the second sub-chamber tends to open the valve, a first duct connecting the first sub-chamber to said conduit at a point downstream of the outlet valve, a second duct connecting the second sub-chamber to said conduit at a point between the inlet and second valve, means maintaining a reference pressure in the first sub-chamber, and a control valve responsive to the pressure downstream of the second valve for equalising fluid pressure upstream and downstream of the inlet valve, said control valve being actuated to equalise said pressures when the fluid pressure downstream of the second valve attains a predetermined value.

2. A fluid flow control valve unit including a housing, a fluid conduit through the housing, an inlet valve in the housing, resilient means for biasing the inlet valve towards its closed position to prevent fluid flow through the housing, a second valve in the housing operable separately from the inlet valve and positioned downstream with respect to fluid flow of the inlet valve, resilient means urging the second valve to a closed position to stop fluid flow, an auxiliary pressure chamber in the housing, a movable member in the chamber dividing the chamber into first and second sub-chambers, the second valve being operatively connected with the movable member to be moved thereby, the connection being such that pressure fluid in the first sub-chamber tends to close the second valve while pressure fluid in the second sub-chamber tends to open the second valve, a first duct connecting the first sub-chamber with the conduit downstream of the second valve, a second duct connecting the second sub-chamber with the conduit at a point intermediate the inlet and the second valves, pressure relief means co-operating with the second sub-chamber for maintaining a predetermined maximum fluid pressure in the second sub-chamber, and a control valve resiliently loaded to a predetermined rest position, and responsive to excess pressure conditions downstream of the second valve to equalise fluid pressure across the inlet valve whereby the resilient loading of the latter valve can close the inlet valve.

3. A fluid flow control valve unit including a housing, a fluid conduit through the housing, an inlet valve in the housing, resilient means for biasing the inlet valve towards its closed position to prevent fluid flow through the housing, a second valve in the housing operable separately from the inlet valve and positioned downstream with respect to fluid flow of the inlet valve, resilient means urging the second valve to a closed position to stop fluid flow, an auxiliary pressure chamber in the housing, a movable member in the chamber dividing the chamber into first and second sub-chambers, the second valve being operatively connected with the movable member to be moved thereby, the connection being such that pressure fluid in the first sub-chamber tends to close the second valve while pressure fluid in the second sub-chamber tends to open the second valve, a first duct connecting the first sub-chamber with the conduit downstream of the second valve, a second duct connecting the second sub-chamber with the conduit at a point intermedate the inlet and the second valves, a third duct connecting the second sub-chamber to atmosphere when the movable member is in a predetermined position in the auxiliary chamber, a calibrated orifice in said third duct, a relief valve for maintaining a predetermined maximum pressure setting in the second sub-chamber, and a control valve resiliently loaded to a predetermined rest position, and responsive to excess pressure conditions downstream of the second valve to equalise fluid pressure across the inlet valve whereby the resilient loading of the latter valve can close the inlet valve.

4. A fluid flow control valve unit including a housing, a fluid conduit through the housing, a hollow piston valve having a closed end and a cylindrical skirt, means in the housing for supporting the hollow piston valve for slidable movement relative to the housing to control fluid flow in the conduit, a fixed wall in the housing with which the skirt can slidably engage, the piston end and skirt and said wall defining a first auxiliary pressure fluid chamber, means for resiliently loading the piston valve towards its closed positions to prevent fluid flow in said conduit, a second valve in the housing at a position downstream of the hollow piston valve with respect to the direction of fluid flow through the conduit, second resilient means urging the second valve to its closed positions to stop fluid flow, a second auxiliary pressure chamber in the housing, a movable wall in the second auxiliary pressure chamber dividing the second auxiliary chamber into first and second sub-chambers, the second valve being operatively connected with the movable member to be moved thereby, the connection being such that pressure fluid in the first sub-chamber tends to open the second valve whereas pressure fluid in the second sub-chamber tends to open the second valve, a first duct connecting the first sub-chamber with the conduit downstream of the second valve, a second duct connecting the second sub-chamber with the conduit at a point intermediate of the hollow piston valve and the second valve, pressure relief means co-operating with the second sub-chamber for maintaining a predetermined maximum fluid pressure in the second sub-chamber, and a control valve resiliently loaded to a predetermined rest position and responsive to excess pressure conditions downstream of the second valve to equalise fluid pressure across the hollow piston valve whereby the resilient loading of the latter can close same to stop fluid flow through the valve unit.

5. A fluid flow control valve unit as claimed in claim 4, and including a further duct which is arranged to vent the first auxiliary chamber to atmosphere while the hollow piston valve is open.

6. A fluid flow control valve unit as claimed in claim 4, and including a further duct which, while the hollow piston valve is open, vents the first auxiliary chamber to atmosphere, means on said control valve for closing said further duct on operation of the control valve in response to said excess pressure.

7. A fluid flow control valve unit as claimed in claim 4, and comprising manually operable means for actuating said control valve to equalise the fluid pressures across the hollow piston valve to effect selective closure of the hollow piston valve.

8. A fluid flow control valve as claimed in claim 4, and comprising electromagnetic means for actuating the control valve o equalise the fluid pressures across the hollow piston to effect selective closure of the hollow piston valve.

9. A fluid flow control valve as claimed in claim 4, in which means are provided for holding the control valve in position to which it is moved by said excess pressure.

10. A fluid flow control valve unit including a housing, a fluid conduit through the housing, a hollow piston valve having a closed end and a cylindrical skirt, means in the housing for supporting the hollow piston valve for slidable movement relative to the housing to control fluid flow in the conduit, a fixed wall in the housing with which the skirt can slidably engage, the piston end and skirt and said wall defining a first auxiliary pressure fluid chamber, means for resiliently loading the piston valve towards its closed positions to prevent fluid flow in said conduit, a second piston valve in the housing at a position downstream of the hollow piston valve with respect to the direction of fluid flow through the conduit, second resilient means urging the second piston valve to its closed position, the second piston valve having a cylindrical skirt and a transverse web connected to the skirt intermediate the ends of the skirt, means in the housing upon which the web is mounted for slidable movement relative to the housing, a second auxiliary pressure chamber in the housing defined in part by said cylindrical skirt in such manner that the web forms a movable wall dividing the auxiliary chamber into first and second sub-chambers so that pressure fluid in the first sub-chamber tends to open the second piston valve and pressure fluid in the second sub-chamber tends to close the second piston valve, a first duct connecting the first sub-chamber with the conduit downstream of the second valve, a second duct connecting the second sub-chamber with the conduit at a point intermediate of the hollow and second piston valves, pressure relief means co-operating with the second sub-chamber for maintaning a predetermined maximum fluid pressure in the second sub-chamber and a control valve resiliently loaded to a predetermined rest position and responsive to excess pressure conditions downstream of the second valve to equalise fluid pressure across the hollow piston valve whereby the resilient loading of the latter can close same to stop fluid flow through the valve unit.

11. A fluid flow control valve unit, as claimed in claim 10, and comprising a third duct for connecting the second sub-chamber to atmosphere, a boss carried by the web which is adapted to control the venting of the second sub-chamber via the third duct in relation to the position of the second valve.

12. A fluid flow control valve unit as claimed in claim 10, and including a further duct which, while the hollow piston valve is open, vents the first auxiliary chamber to atmosphere, means on said control valve for closing said further duct on operation of the control valve in response to said excess pressure.

13. A fluid flow control valve unit as claimed in claim 10 and comprising manually operable means for actuating said control valve to equalise the fluid pressures across the hollow piston valve to effect selective closure of the hollow piston valve.

14. A fluid flow control valve unit as claimed in claim 10 and comprising electromagnetic means for actuting the control valve to equalise the fluid pressures across the hollow piston to effect selective closure of the hollow piston valve.

15. A fluid flow control valve as claimed in claim 10, in which the hollow piston valve and the second piston valve are movable on a common axis, and in which the skirt of the hollow piston valve overlaps the skirt of the second piston valve.

References Cited by the Examiner

UNITED STATES PATENTS

| 657,707 | 9/00 | Reese | 137—496 |
| 2,592,474 | 4/52 | Schnyder | 137—219 |
| 2,681,073 | 6/54 | Fraser | 137—614.21 XR |

ISADOR WEIL, *Primary Examiner.*

MARTIN P. SCHWADRON, *Examiner.*